June 11, 1946.  P. C. GOETZ  2,401,924
REMOVAL OF SILICA FROM WATER
Filed July 24, 1940   4 Sheets-Sheet 1

Fig. 1.

INVENTOR
PAUL C. GOETZ
BY
Clarence A Kerr
ATTORNEY

June 11, 1946.  P. C. GOETZ  2,401,924
REMOVAL OF SILICA FROM WATER
Filed July 24, 1940  4 Sheets-Sheet 2

INVENTOR
PAUL C. GOETZ
BY
Clarence Okerz
ATTORNEY

June 11, 1946.    P. C. GOETZ    2,401,924
REMOVAL OF SILICA FROM WATER
Filed July 24, 1940    4 Sheets-Sheet 4

INVENTOR
PAUL C. GOETZ
BY
Clarence D. Kerr
ATTORNEY

Patented June 11, 1946

2,401,924

UNITED STATES PATENT OFFICE 2,401,924

REMOVAL OF SILICA FROM WATER

Paul C. Goetz, Mount Holly, N. J., assignor to The Permutit Company, New York, N. Y., a corporation of Delaware Application July 24, 1940, Serial No. 347,121

5 Claims. (Cl. 210—16)

This invention relates to the treatment of water for removing impurities such as silica therefrom. Natural waters which must be conditioned prior to use as boiler feedwater or for other purposes frequently contain beside the usual calcium and magnesium salts and other compounds forming boiler scale, a certain amount of "dissolved silica." By the terms "silica" or "dissolved silica" as used herein is meant silica as such or in the form of silicates or other compounds dissolved or dispersed colloidally or otherwise in water as distinguished from sand or other forms of silica that can be separated easily by filtration of the water.

The presence of silica in boiler feedwater in appreciable quantities creates deposits upon the heating surfaces of a boiler of a dense impervious nature which are very difficult to remove. This silica scale is particularly troublesome in boilers operating at pressures of 250 lbs. per square inch and higher because, at the high temperatures employed with these high pressures, other salts in the water are decomposed and silicate scale forms more readily.

Various methods have been proposed for removing or lowering the "dissolved silica" content of water to minimize this scale formation, but these procedures have been objectionable either because of their high cost of operation or because they have not reduced the silica content of the water to a satisfactory degree. These procedures have included the "external" treatment of water prior to being fed into the boiler, and also the addition of chemicals to the feedwater to produce precipitation of silicates inside the boiler known as "internal" treatments. The latter methods have the additional objection, of course, of increasing the total electrolyte content of the water going into the boiler which correspondingly increases the amount of sludge formed inside the boiler. Such "internal" treatment of the feedwater frequently produces priming and foaming difficulties.

The extent of silica reduction in boiler feedwater that is desirable in practice is determined largely by the maximum silica concentration permissible in the concentrated salines within the boiler. As the water in a boiler is evaporated and converted into steam, practically all of the substances present in the feedwater, with the exception of small amounts carried over with the steam, are left behind and concentrate in the salines. This is true with respect to the silica. Other things being equal, the concentration of this silica in the boiler determines the extent of the difficulties caused by its presence as manifested by scale formation on the internal heat transfer surfaces of the boiler, deposits in turbines or an abrasive effect on the turbine blades which occurs when appreciable silica is present and is carried over with the steam, particularly in high-pressure practice.

It is possible to reduce the silica content of these concentrated boiler salines by blowing off periodically a portion of the salines and replacing it with fresh feedwater. However, such procedure may be costly and inconvenient when appreciable silica is present in the feedwater and it is desirable to maintain very low concentrations of the order of 15 to 25 parts per million of silica as a maximum in the concentrated salines. Thus, to satisfy such requirements, it is necessary to reduce the silica in the feedwater to a very low concentration, usually about 3 parts per million or less, although in some cases slightly higher concentrations, such as 5 to 6 parts per million, in the treated feedwater makeup may be satisfactory. This balance between the boiler blowoff and the silica content of the feedwater must be considered in each case to arrive at the most economical and satisfactory adjustment for keeping below a predetermined maximum of silica concentration in the boiler salines.

It is an object of this invention to reduce the silica content of water to a safe maximum by an "external" treatment that is economical and efficient.

A further object of the invention is to accomplish this reduction in silica content while avoiding any substantial increase in the electrolyte content of the water.

A further object of the invention is to treat hard water containing silica to effect simultaneous softening, removal of silica, and reduction of the total electrolytes dissolved in the water.

Another object of the invention is to remove silica from water by subjecting the water at an elevated temperature to prolonged contact with silica-absorbing magnesium compounds.

The treatment of water for removing silica therefrom in accordance with this invention preferably utilizes a magnesium-rich sludge which is brought into an intimate, thorough and prolonged contact with the water while the water is at a temperature above about 50° C. A satisfactory material containing suitable magnesium compounds is a sludge obtained by the precipitation of calcium and magnesium salts from hard water by the addition thereto of lime, and soda ash if needed, or other suitable chemicals as in the hot lime soda process of water softening. If the raw water treated does not contain sufficient quantities of magnesium salts, the ionic or dissolved magnesium content of the water can be artificially increased before softening, or a sludge rich in MgO and $Mg(OH)_2$ can be produced by using a dolomitic lime instead of an ordinary lime for softening, or by the addition of other silica absorbing magnesium compound to the water. In some cases, it may be desirable to use dolomitic lime for softening and utilize the magnesia rich sludge thus obtained as a means of increasing the ionic magnesium content of the water.

I have discovered that at elevated temperatures (above 50° C.), the silica content of a water can be reduced to a safe maximum by maintaining a sufficient concentration of such a sludge relatively high in suitable magnesium compounds substantially uniformly suspended in the water for a period of time. The factors of temperature, initial silica content of the water, sludge concentration, magnesium content of the sludge, and time of sludge-water contact all have important effects on the extent of silica removal. The removal of silica from the water is also greatly facilitated by precipitation of ionic magnesium in the water as the hydroxide after, during or immediately prior to the agitation of the sludge and water mixture. It will be apparent, therefore, that my silica removal treatment is well suited for use in conjunction with the hot lime soda process of softening hard water. It is to be distinctly understood, however, that the invention is not limited to the treatment of hard water but may be applied as well to soft waters containing silica.

Suitable apparatus for carrying out my silica removal process simultaneously with softening of the water is illustrated in the accompanying drawings by way of example, although it should be understood that other forms of apparatus may be used.

By the term "ionic magnesium" as used herein is meant the magnesium ions in solution in the water or the magnesium in the water in a form capable of reacting with lime, sodium hydroxide or the like to precipitate magnesium hydroxide.

By the term "sludge magnesium" as used herein is meant the magnesium in the form of undissolved magnesium compounds in the sludge which will probably consist of a mixture of MgO and $Mg(OH)_2$.

The concentrations of ionic magnesium and sludge magnesium will be expressed herein for convenience in terms of milligram equivalent weights per liter (meq./l.), which in the case of magnesium would amount to 0.0121 gram per liter for each meq./l.

Figure 1:
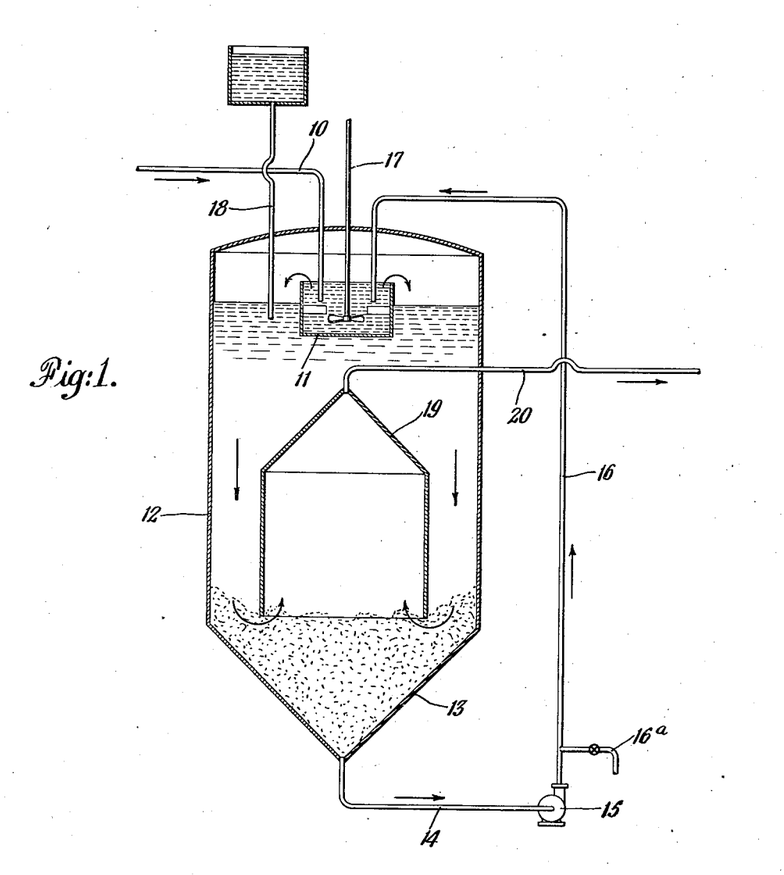
Figure 1 is a diagrammatic sectional view of a precipitating tank in the hot lime soda process of softening water equipped for recirculating and agitating sludge in the water in accordance with a preferred embodiment of my invention.
Figure 2:
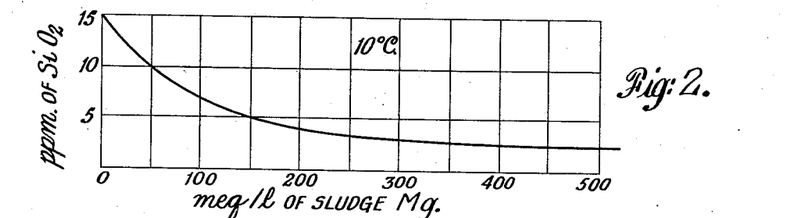
Figures 2, 3 and 4 are curves showing the effect of sludge magnesium concentrations on the removal of silica from water at different temperatures.
Figure 3:
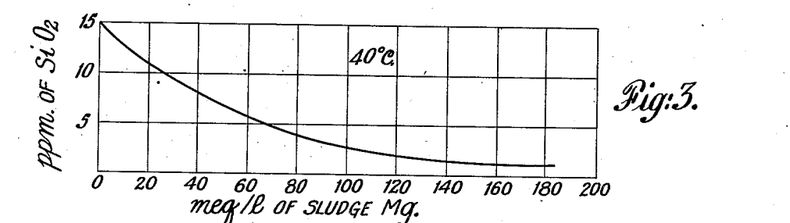
Figure 4:
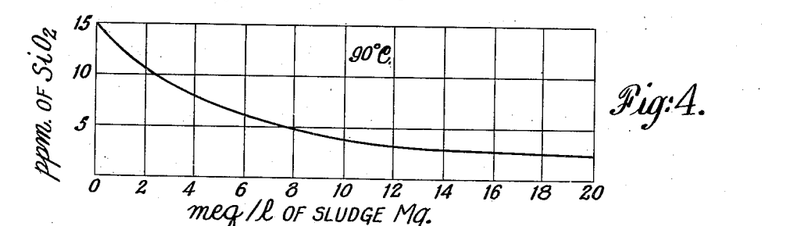

According to one embodiment of my invention, water to be treated is heated to a temperature above 50° C., and preferably above 80° C., and introduced through the line 10 into the small fixed chamber 11 inside the precipitating tank 12 of a hot lime soda plant. Sludge is withdrawn from the conical bottom 13 of tank 12 through the line 14 by means of a suitable pump 15 and delivered through line 16 to the chamber 11 where it is mixed with the heated water by means of the agitator 17. This agitator may be driven from any suitable source of power (not shown).

The mixture of sludge and water in proper proportions overflows from the chamber 11 into the precipitating tank 12 and is dosed with lime or dolomitic lime, and soda ash if needed, added through the line 18 to precipitate all or a portion of the hardness. The sludge that is mixed with the water and the sludge that is formed during softening settle to the bottom of the precipitating tank, and the softened water with most of its silica removed may be drawn off from the top of the uptake 19 through line 20.

If desired, the fixed chamber 11 may be omitted provided that suitable provision is made to mix together the sludge from pipe 16, the softening chemicals from line 18 and the water from line 10 as they are introduced into the tank 12. Chamber 11, either inside the precipitation tank 12 or as a separate chamber outside of tank 12, is helpful in reducing the silica content of the water, however, because the preliminary contact between the magnesium-rich sludge and the water before the alkaline softening chemicals are added, increases the ionic magnesium content of the water. The subsequent addition of CaO to this water thus precipitates more magnesium hydroxide which in turn carries down more silica with it.

It will be apparent from the foregoing that the silica content of a water may be reduced to the desired extent by—

(a) Precipitating ionic or dissolved magnesium from solution, the precipitated compound being assumed to be $Mg(OH)_2$, or (b) Contacting the silica-containing water with silica-absorbing magnesium compounds in the undissolved and solid form, or (c) Combining the methods of (a) and (b).

In following the procedure of (a), there may be sufficient ionic magnesium in the raw water for this purpose, or if more ionic magnesium is needed in the water, it may be added to the water. Of course, a soluble salt such as magnesium sulfate could be dissolved in the water to increase its ionic magnesium content but this is expensive and increases the electrolyte content of the water since an equivalent amount of added sulfate remains in the water after the magnesium of this magnesium sulfate is precipitated. If the ionic magnesium in the water needs to be increased, therefore, I prefer to obtain this increase by means of less expensive magnesium compounds, such as MgO or Mg(OH)$_2$, from a sludge containing these compounds, or by means of suitable forms of MgCO$_3$. The magnesium ion can be dissolved from these compounds simply by contacting these substances with water having a pH somewhat lower than that prevailing in the precipitation tank. Such a lower pH exists in water containing some CO$_2$ or bicarbonate ion and magnesium is then dissolved from MgO or Mg(OH)$_2$ according to the following reactions:

(1) $\quad MgO + CO_2 \longrightarrow MgCO_3$ or (2) $\quad MgO + 2HCO_3^- \longrightarrow MgCO_3 + CO_3^= + H_2O$ With Mg(OH)$_2$, the reactions are essentially the same. The MgCO$_3$ formed in these reactions is fairly soluble, but if its solubility is exceeded, it can be readily transformed into the more soluble bicarbonate according to the following reaction:

(3) $\quad MgCO_3 + CO_2 + H_2O \rightarrow Mg(HCO_3)_2$

When this MgCO$_3$ or Mg(HCO$_3$)$_2$ is precipitated with a hydroxide, e. g. Ca(OH)$_2$, the following reactions take place:

(4) $\quad MgCO_3 + Ca(OH)_2 \rightarrow Mg(OH)_2 + CaCO_3$ (5) $\quad Mg(HCO_3)_2 + 2Ca(OH)_2 \rightarrow$
$\quad\quad\quad Mg(OH)_2 + 2CaCO_3 + 2H_2O$ Both of the reaction products obtained according to Equations 4 and 5 are relatively insoluble, and thus the solution and precipitation of the magnesium take place without leaving any salts in solution, i. e., without increasing the total dissolved solids in the water.

Calcined magnesite (MgO), precipitated

Mg(OH)$_2$ and precipitated magnesium carbonate (prepared by separating the fairly soluble carbonate from a concentrated solution are quite suitable for dissolving magnesium according to Equations 1, 2 or 3. Magnesium carbonate as it occurs in nature in the form of magnesite or dolomite, even when finely powdered, is relatively insoluble under these conditions and therefore is not suitable for use directly in increasing the ionic magnesium content of water.

One very economical source of magnesium for furnishing a sludge rich in MgO and Mg(OH)$_2$ is the use of a dolomitic lime instead of a relatively pure lime free from magnesia such as is generally specified for precipitating the hardness from water. Such a dolomitic lime, which may be manufactured by calcining dolomite, is represented in the fully calcined condition by the symbol CaO·MgO, and in the so-called hydrated condition by the symbol Ca(OH)$_2$·MgO. For most purposes, a dolomitic lime containing about 5 to about 45% MgO will be satisfactory.

When such a dolomitic lime is added to the water in the precipitation tank according to this invention, the CaO or Ca(OH)$_2$, as the case may be, precipitates the hardness from the water in the usual manner, and the MgO simply accumulates in the sludge formed where it mixes with the precipitated CaCO$_3$ and Mg(OH)$_2$. Neither this MgO nor the precipitated Mg(OH)$_2$ pass into solution in the precipitation tank because they remain relatively insoluble in the high pH environment. These solid magnesium compounds are thus available in the sludge from which magnesium may be dissolved to increase the ionic magnesium of water prior to softening, or these magnesium compounds may be used directly in the undissolved state for absorbing silica by prolonged contact with the water.

Such a contact treatment, as indicated above in (b), may be carried out to remove silica from the water by contacting the water with a suitable calcined magnesite, the MgO-containing residue in sludge from the use of calcined dolomite as the precipitant, or the Mg(OH)$_2$ in the sludge resulting from the precipitation of ionic magnesium. When such solid forms of magnesium compounds are utilized, it is merely necessary to agitate the water to be treated for a suitable period with a sufficient concentration of silica-absorbing magnesium compounds so that the absorption may take place.

In general, however, the amounts of solid magnesium compounds required for substantial silica reduction are fairly high at elevated temperatures even though silica absorption by such compounds is much more efficient at higher temperatures than at lower temperatures as illustrated by the curves in Figs. 2 to 5. Also, the specific capacity of different solid magnesium compounds for absorbing silica varies to some extent. For example, different calcined magnesites agitated with water in the same proportions and under the same conditions will absorb somewhat different amounts of silica from the water as can be readily determined by empirical laboratory tests by one skilled in the art. The grain sizes and silica contents of these magnesias account for at least some of this difference in capacity with smaller grain sizes favoring silica absorption due to a larger absorbing surface, and with higher silica contents reducing the capacity of the magnesia for absorbing silica.

My invention, however, includes the discovery that regardless of the particular silica-absorbing magnesium compound or combination of compounds employed, a smaller quantity of this compound is needed to obtain the same result under a given set of operating conditions, if the solid magnesium compound is allowed to accumulate until a fairly concentrated suspension is reached. After a sufficient accumulation of the magnesium compound in suspension has been obtained, portions of this accumulation of solid magnesium compound may be intermittently or continuously discharged from the system and quantities of fresh magnesium compound added to replace the magnesium compound discharged. This method of operation enhances the silica absorption to such an extent that much lower amounts of magnesium compound can be fed to obtain the desired reduction, or conversely, the same dosage of magnesium compound can be used to produce a better silica reduction.

This surprising improvement in removal of silica from water with a magnesium compound is obtained in spite of the fact that as the magnesium compound absorbs silica, its capacity for such absorption rapidly becomes exhausted. The effect of this silica contamination in reducing the absorbing capacity of a magnesium compound is readily shown by the following data resulting from the treatment of successive batches of water with the same initial quantity of a calcined magnesite. A given quantity of a magnesium-containing sludge was agitated with a given quantity of water at 90° C. containing 15.9 parts per million of silica. The sludge was allowed to settle out and the silica content of the supernatant liquid was then determined. Successive quantities of fresh water were then treated in the same manner with the same sludge and the following results were obtained.

*Table I*

| Run No. | Initial SiO$_2$ in P. P. M. | Final SiO$_2$ in P. P. M. | SiO$_2$ removed in P. P. M. |
|---|---|---|---|
| 1 | 15.9 | 0.8 | 15.1 |
| 2 | 15.9 | 1.1 | 14.8 |
| 3 | 15.9 | 2.4 | 13.5 |
| 4 | 15.9 | 10.4 | 5.5 |
| 5 | 15.9 | 13.6 | 2.3 |
| 6 | 15.9 | 15.0 | 0.9 |
| 7 | 15.9 | 15.6 | 0.3 |

Notwithstanding the rapid loss of silica-absorbing capacity, excellent removal of silica from water can be obtained as stated above if a fairly high concentration of accumulated magnesium compound is maintained in the system even though only relatively small amounts of solid magnesium compound are added for each batch or increment of water treated. By properly correlating the amount of magnesium compound make-up added to the system with the amount of magnesium compound discharged from the system, a suitable equilibrium can be readily maintained. By this method, a substantial increase in the amount of silica removal from the water per unit of magnesium compound employed is obtained.

The following table demonstrates the effect of maintaining an accumulation of magnesium compound in a water treating system for enhancing the efficiency of the removal of silica from the water. The data for runs 1, 2, 8 and 9 in this table were obtained by treating batches of water with fresh quantities of calcined Grecian magnesite and heavy calcined magnesite. The amounts of the magnesium compound indicated were agitated with the water for 20 minutes at 90° C. in each case, the magnesia was allowed to settle out and the supernatant liquid was analyzed for silica.

The other results shown in the table consist of several series of runs. In making each of these series of runs, a quantity of fresh magnesium compound was used for treating several successive batches of water. After the initial quantity of magnesium compound had become sufficiently contaminated with silica, small quantities of the accumulated compound were discharged from the system and corresponding quantities of fresh make-up magnesium compound were added before the treatment of each new batch of water. Each batch of water was agitated at 95° C. with the magnesium compound for 20 minutes and the treated water, which had a pH of 10.0 to 10.3, was analyzed for silica. The initial silica content of the water in each run was about 15 parts per million, which is the same as 15 mgs. per liter. The raw water used for these tests contained some CO$_2$ and bicarbonate ion which was neutralized with an alkali in each case before the silica removing treatment.

*Table II*

| Run No. | Amount added, meq./l. | Amount discharged, meq./l. | Total concentration, meq./l. | SiO$_2$ in effluent mg./l. | Average SiO$_2$ absorbed | |
|---|---|---|---|---|---|---|
| | | | | | No. of runs | Mg./meq |
| TESTS WITH CALCINED GRECIAN MAGNESITE | | | | | | |
| 1 | 10 | 0 | 10 | 4.8 | 1 | 1.02 |
| 2 | 25 | 0 | 25 | 0.8 | 2 | 0.57 |
| 3 | 20 | 0 | 20 | 1.0 | | |
| 4 | 0 | 0 | 20 | 6.5 | | |
| 5 | 5 | 5 | 20 | 5.2 | | |
| 6 | 5 | 5 | 20 | 4.4 | | |
| 7 | 5 | 5 | 20 | 4.4 | 5–7 | 2.1 |
| TESTS WITH HEAVY CALCINED MAGNESITE | | | | | | |
| 8 | 10 | 0 | 10 | 2.3 | 8 | 1.27 |
| 9 | 25 | 0 | 25 | 0.5 | 9 | 0.58 |
| 10 | 20 | 0 | 20 | 0.5 | | |
| 11 | 0 | 0 | 20 | 4.4 | | |
| 12 | 5 | 5 | 20 | 1.2 | | |
| 13 | 0 | 0 | 20 | 8.7 | | |
| 14 | 5 | 5 | 20 | 2.4 | | |
| 15 | 5 | 5 | 20 | 1.5 | | |
| 16 | 5 | 5 | 20 | 2.2 | | |
| 17 | 5 | 5 | 20 | 1.8 | | |
| 18 | 5 | 5 | 20 | 2.5 | | |
| 19 | 5 | 5 | 20 | 2.0 | 14–19 | 2.5 |
| 20 | 2 | 2 | 20 | 5.4 | | |
| 21 | 2 | 2 | 20 | 7.0 | | |
| 22 | 2 | 2 | 20 | 7.0 | 20–22 | 4.3 |
| 23 | 4 | 4 | 20 | 2.6 | | |
| 24 | 4 | 4 | 20 | 1.1 | | |
| 25 | 4 | 4 | 20 | 1.7 | 23–25 | 3.3 |
| 26 | 100 | 0 | 100 | 0.2 | | |
| 27 | 0 | 0 | 100 | 0.5 | | |
| 28 | 0 | 0 | 100 | 3.3 | | |
| 29 | 4 | 4 | 100 | 1.0 | | |
| 30 | 4 | 4 | 100 | 0.8 | | |
| 31 | 4 | 4 | 100 | 0.8 | | |
| 32 | 4 | 4 | 100 | 1.0 | | |
| 33 | 4 | 4 | 100 | 0.7 | 29–33 | 3.5 |
| 34 | 2 | 2 | 100 | 1.2 | | |
| 35 | 2 | 2 | 100 | 2.0 | | |
| 36 | 2 | 2 | 100 | 2.3 | | |
| 37 | 2 | 2 | 100 | 1.2 | | |
| 38 | 2 | 2 | 100 | 1.9 | | |
| 39 | 2 | 2 | 100 | 1.8 | | |
| 40 | 2 | 2 | 100 | 3.2 | | |
| 41 | 2 | 2 | 100 | 2.2 | | |
| 42 | 2 | 2 | 100 | 3.2 | | |
| 43 | 2 | 2 | 100 | 2.1 | 34–43 | 6.5 |
| 44 | 1 | 1 | 100 | 4.8 | | |
| 45 | 1 | 1 | 100 | 5.9 | | |
| 46 | 1 | 1 | 100 | 6.3 | 44–46 | 9.3 |
| 47 | 2 | 2 | 1,000 | 1.5 | | |
| 48 | 2 | 2 | 1,000 | 1.7 | | |
| 49 | 2 | 2 | 1,000 | 1.5 | | |
| 50 | 2 | 2 | 1,000 | 1.7 | 47–50 | 6.7 |
| 51 | 1 | 1 | 1,000 | 2.0 | | |
| 52 | 1 | 1 | 1,000 | 2.1 | | |
| 53 | 1 | 1 | 1,000 | 2.1 | | |
| 54 | 1 | 1 | 1,000 | 2.3 | | |
| 55 | 1 | 1 | 1,000 | 2.4 | | |
| 56 | 1 | 1 | 1,000 | 2.3 | | |
| 57 | 1 | 1 | 1,000 | 2.3 | | |
| 58 | 1 | 1 | 1,000 | 2.2 | 54–58 | 12.7 |

The foregoing data clearly shows the much higher efficiency of silica absorbing magnesium compounds, or, in other words, the greater capacity of each milliequivalent of magnesium compound to remove silica from water when a sludge is allowed to accumulate in a system as compared with the use simply of fresh batches of magnesium compound for each batch or two of water. Furthermore, the greater the quantity of magnesium-containing sludge that is allowed to accumulate, the greater will be the efficiency of the process per unit of magnesium compound added.

Figure 10:
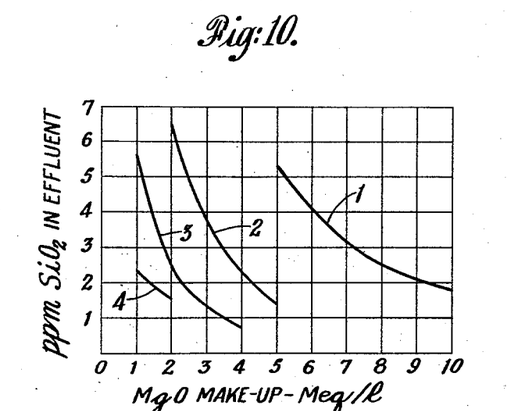
Figures 10 and 11 show groups of curves illustrating the relative efficiency of removing silica from water by using different quantities of accumulated magnesium compound in the system to absorb the silica.
Figure 11:
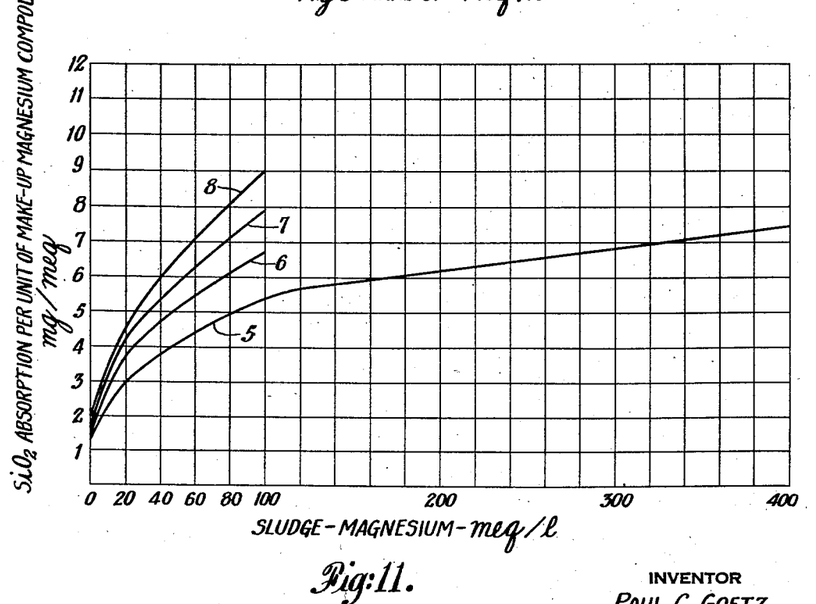

In order to illustrate further the effect on silica removal of utilizing an accumulated magnesium-containing sludge in the system, reference may be had to the curves in Figures 10 and 11. In Figure 10, four curves are shown based on the data in the above table and obtained by plotting the parts per million of silica in the treated water or effluent as the ordinate, and the meq./l. of heavy calcined magnesite added for each batch as the abscissa, a corresponding quantity of the accumulated sludge being discharged for each increment of MgO added. Curve 1 shows the result when no sludge or magnesium compound is allowed to accumulate, and curves 2, 3 and 4 represent the results when the system is maintained in equilibrium with accumulations of 20, 100 and 1000 meq./l. of MgO, respectively.

The curves in Fig. 11 illustrate graphically the efficiency of each unit of heavy calcined magnesite for absorbing silica under different conditions. These curves were obtained by plotting the efficiency of the magnesium compound in terms of the number of milligrams of silica absorbed by each milliequivalent of make-up magnesium compound as the ordinate, and the number of milliequivalents of accumulated magnesium compound maintained in the system as the abscissa. Curves 5, 6, 7 and 8 represent the efficiency when a water containing initially 15 parts per million is treated to produce effluents containing 2, 3, 4 and 5 parts per million of silica, respectively.

A prolonged contact of magnesium compounds such as those in the sludge with the water may be obtained with suitable agitators or by recirculating sludge in the water treating system. This makes for simpler construction and operation of the equipment than that required when magnesium is dissolved and thereafter precipitated, and therefore, even though the specific absorbing capacity of undissolved magnesium compounds is less than that of an equivalent amount of ionic magnesium precipitated from solution (compare Figs. 2 to 5 with Figs. 6 to 9), it may often be more desirable to resort to the use of the undissolved magnesium compounds than to the precipitation of ionic magnesium.

This is especially true where higher temperatures or other conditions favoring silica removal exist so that the amount of magnesium compounds required is smaller, or where the total volume of water to be treated is smaller so that the cost of treatment of unit volume is not so important because the total treating cost is not high. In this case, the treating cost is outweighed by the advantages of lower initial equipment cost and greater operating simplicity. Another situation in which the use of the undissolved magnesium compounds is advantageous is for the treatment of a raw water low in hardness so that very little lime is required for its treatment. It follows from the foregoing that, in many instances, the combined use of precipitating ionic magnesium and contacting the water with undissolved magnesium compounds according to (c) will be desirable. In fact, there is ordinarily some ionic magnesium present in the raw water and, therefore, this ionic magnesium can be readily precipitated along with the contacting of the water with undissolved silica-absorbing magnesium compounds added thereto.

The proportion of silica-absorbing magnesium compounds brought into contact with the water has an important effect on the amount of silica removed. This proportion in turn depends upon the quantity of sludge employed when the magnesium compounds of the sludge are utilized, and the proportion of magnesium compounds in the sludge. The absorption of silica is also dependent on the time during which the sludge-magnesium compounds are in contact with the water, longer contacting times, of course, increasing the removal of silica by absorption.

The amount of silica being removed from the water or the difference between the initial and final silica contents of the water also affects the efficiency of silica removal because the magnesium compounds are not as effective after they have absorbed silica and become thus contaminated. For a given concentration of undissolved magnesium compounds in the system under a given set of operating conditions, the degree of silica contamination and thus the efficiency of silica removal by absorption is dependent upon the amount of sludge discharged to waste per unit volume of water treated and the corresponding amount of fresh magnesium compounds introduced into the system to replace the silica-contaminated magnesium compounds discharged in the sludge.

Figure 5:
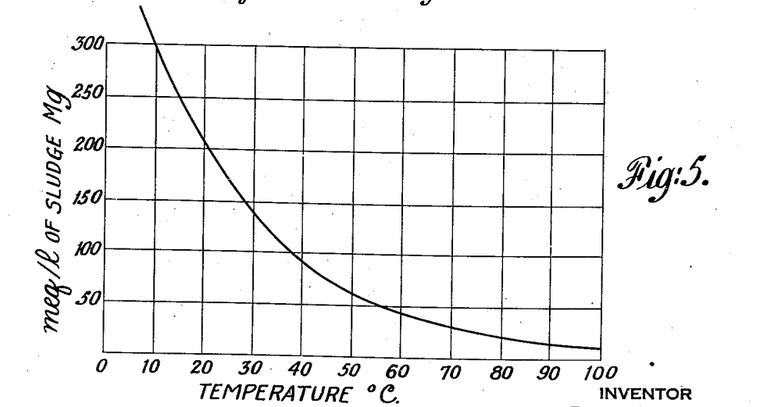
Figure 5 is a composite curve based on Figs. 2, 3 and 4 to show the effect of temperature on the removal of silica from water by treatment with magnesium-containing sludge.
Figure 6:
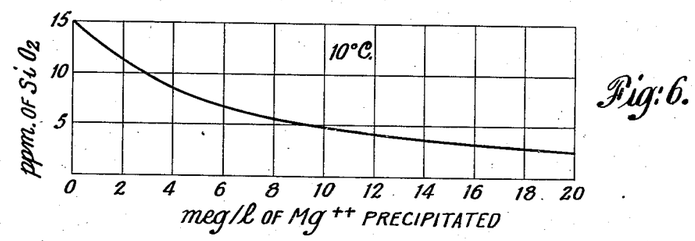
Figures 6, 7 and 8 are curves showing the effect of precipitating ionic magnesium as the hydroxide on the removal of silica from water at different temperatures.
Figure 7:
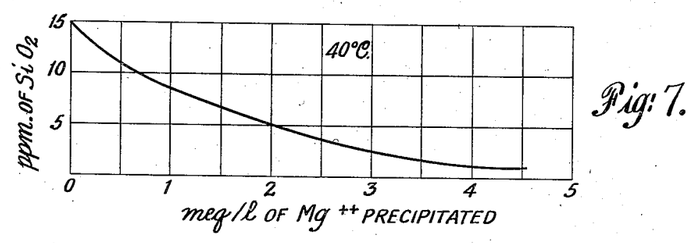
Figure 8:
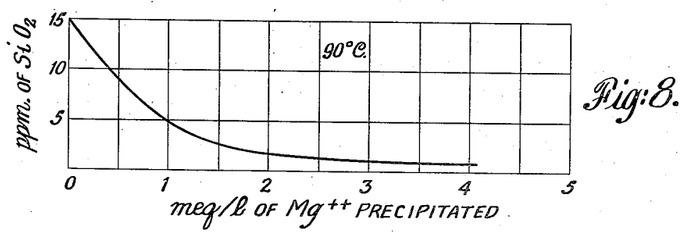

The temperature of the water during treatment has a most important bearing on the effectiveness of silica removal by absorption according to my invention. In fact, silica can be removed satisfactorily from water at temperatures above 50° C. and preferably above 80° C., merely by recirculating a magnesium-rich sludge to provide an intimate contact between the water and sludge. The effect of temperature on the removal of silica from water by absorption alone is illustrated by the curves in Figs. 2 to 5. The curves in Figs. 2, 3 and 4 were prepared by mixing water containing 16 to 18 parts per million of silica with different quantities of a sludge obtained from a lime softening plant and containing about 30% of magnesium compounds in the form of MgO and Mg(OH)$_2$. Three series of these water treatments were carried out with the water at 10°, 40° and 90° C., and in each case the sludge was added to the water, agitated for 30 minutes, centrifuged for 5 minutes, and the water was then filtered through paper, cooled if necessary and its silica content determined. The curve in Fig. 5 shows the quantities of sludge-magnesium required at different temperatures to reduce the silica content of the water to 3 parts per million by the use of sludge-magnesium compounds without precipitating any ionic magnesium. The quantities of sludge-magnesium are expressed in terms of milliequivalents per liter (meq./l.) which is the number of milligram equivalents of magnesium present per liter of water treated. In the case of magnesium (sludge or ionic) this amounts to 0.0121 gram per liter.

Figure 9:
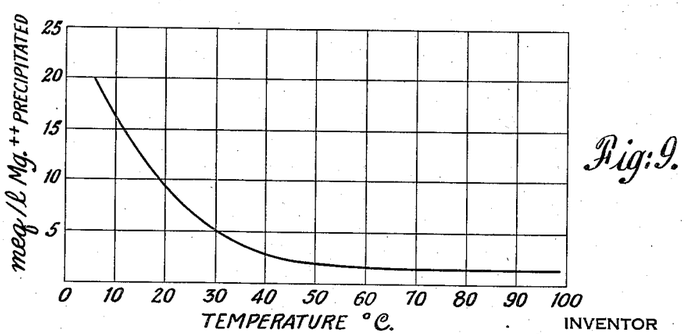
Figure 9 is a composite curve based on Figs. 6, 7 and 8 to show the effect of temperature on the removal of silica from water by precipitation of ionic magnesium as the hydroxide.

The effect of precipitating magnesium hydroxide which carries down silica with it is illustrated by the curves in Figs. 6 to 9. The curves in Figs. 6, 7 and 8 were obtained by treating water containing 16 to 18 parts per million of silica and varying quantities of ionic magnesium at 10°, 40° and 90° C., respectively. In each case, enough chemically pure lime was added to the water to precipitate most of the ionic magnesium in the form of the hydroxide, the mixture was agitated for 30 minutes, filtered through paper, cooled when necessary and the filtrate was tested quantitatively for silica. The curve in Fig. 9 shows the quantities of ionic magnesium that must be precipitated at different temperatures to lower the silica content from 16 to 18 down to 3 parts per million by the precipitation of ionic magnesium. The ionic magnesium precipitated or contained in the water is also expressed in terms of milliequivalents per liter of water.

It will be apparent that if the raw water treated according to my invention contains some magnesium hardness, or if the water is given a preliminary treatment with a magnesia-bearing material such as magnesium-containing sludge to increase the content of ionic magnesium in the water, the silica will be removed both by the precipitation of magnesium hydroxide when lime or dolomitic lime is added, and by absorption. Furthermore, greater absorption of silica will take place if the water is given a preliminary treatment with the sludge because of the resultant increase in the content of ionic magnesium, the precipitation of which is more efficient in removing silica as described above.

The following examples are given as illustrative of the practice of my invention:

*Example I*

A raw water containing 2.3 meq./l. of total hardness of which 0.3 meq./l. was ionic magnesium, 2.3 meq./l. of methyl orange alkalinity and about 16 parts per million of silica was heated to 98° C. and mixed and agitated with 0.12% by weight of sludge for 40 minutes. This sludge had been accumulated from the treatment of previous batches of the water according to this process and contained by weight about 30% of magnesium compounds and about 60% of calcium compounds, chiefly calcium carbonate, or about 18 meq. of magnesium compounds per liter of sludge. About 16 grains of dolomitic lime containing about 32% MgO was then added for each gallon of water to precipitate the hardness, and agitation was continued for an additional 20 minutes after the addition of the chemicals. The sludge formed in and mixed with the water was finally allowed to settle for 30 minutes after which the water was drawn off and filtered. The final silica content of the treated water was found to be 1.6 parts per million.

*Example II*

A raw water containing 2.2 meq./l. of total hardness of which 0.4 meq./l. was ionic magnesium, 2.3 meq./l. of methyl orange alkalinity and about 16 parts per million of silica was treated at a temperature of 98° C. with 16 grains per gallon of a dolomitic lime containing 32% MgO. Immediately after the addition of this dolomitic lime 1.12% by weight of sludge was added and agitated with the water. This sludge had accumulated from previous treatments of the water according to this process and contained about 17.5 meq./l. of magnesium compounds of which about 35% were derived from the precipitation of ionic magnesium and about 96.5% were derived from the dolomitic lime. On a weight basis about 30% of the sludge solids were magnesium compounds and about 70% were calcium compounds, mostly calcium carbonate. The water, dolomitic lime and sludge were agitated for 10 minutes and allowed to settle for 80 minutes after which the water was drawn off and filtered. The final silica content of the water was found to be 1.6 parts per million.

Although the foregoing examples refer to the treatment of water in batches, it will be apparent to those skilled in the art that the same water may be treated continuously in a similar manner as by utilizing the apparatus of Fig. 1 with or without the preliminary agitation chamber 11.

In the event that the heated water is treated according to my invention without any preliminary sludge and water contact, for example, using the apparatus of Fig. 1 but omitting the chamber 11, the extent of the removal of silica will depend upon the initial silica content of the water, the amount of ionic magnesium precipitated from the raw water, the temperature of the water, the rate at which the water is flowed into (or out of) the precipitating tank, which, considered in conjunction with the size and design of the tank, will determine the length of time of sludge and water contact, the relative proportion of magnesium compounds in the sludge, and the rate at which the sludge is recirculated for admixture with incoming water. These last two variables, of course, determine the concentration of sludge-magnesium compounds brought into contact with the water.

In addition to the foregoing variables, the extent of the removal of silica from the water when a preliminary sludge and water contact as in the chamber 11 is employed, will depend upon the size of the preliminary agitation chamber and the pH, or $CO_2$ and bicarbonate content of the raw water. $CO_2$ and/or bicarbonate in the raw water react with MgO to produce the relatively soluble magnesium carbonate during the preliminary sludge and water agitation according to the following equations:

$$CO_2 + MgO \longrightarrow MgCO_3$$

$$2HCO_3^- + MgO \longrightarrow MgCO_3 + CO_3^= + H_2O$$

The magnesium carbonate thus formed requires no more lime for its precipitation than would have been used up in reacting with the $CO_2$ and bicarbonate originally in the water according to the following equations:

$$CO_2 + Ca(OH)_2 \longrightarrow CaCO_3 + H_2O$$

$$2HCO_3^- + Ca(OH)_2 \longrightarrow CaCO_3 + CO_3^= + 2H_2O$$

Therefore, the use of the preliminary sludge and water treatment, although it increases the ionic magnesium content of the water, does not increase the amount of CaO required for softening.

It will be apparent that in the operation of my process, it is necessary to form a sludge rich in magnesium compounds either by precipitation of ionic magnesium from the water, or by the use of a suitable magnesia, dolomitic lime or similar material, or by both means. It is desirable to let this sludge accumulate in the precipitating tank until a sufficient quantity has been obtained for recirculation. Thereafter, suitable quantities of sludge can be removed through the sludge blow-off 16a, either periodically or continuously, to maintain a fairly constant supply of sludge in the precipitating tank.

Although it is not essential, a better removal of silica is usually obtained if the water after treatment is filtered through a suitable non-siliceous filtering medium to remove any turbidity remaining in the effluent.

By the term "lime," as used in the claims, is means not only a relatively pure calcium oxide or hydrate but also impure forms of lime such as the dolomitic limes.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:

1. A process of removing silica from water comprising intimately mixing and agitating the water at a temperature above about 50° C. with an accumulation of a silica absorbing magnesium compound, adding quantities of said compound to said accumulation as additional water is brought into contact therewith, and discharging sufficient quantities of said accumulation to maintain a suitable equilibrium.

2. A process of removing silica from water comprising intimately mixing and agitating the water at a temperature above about 50° C. with an accumulated magnesium-containing sludge, discharging relatively small quantities of said sludge as fresh water is brought into contact therewith, and adding increments of magnesia bearing material to said sludge to replace the quantities thereof discharged.

3. A process of removing silica from water comprising intimately mixing and agitating the water at a temperature above about 50° C. with dolomitic lime, separating the water from the insoluble sludge formed therein, accumulating said sludge, adding additional quantities of dolomitic lime to the accumulation of said sludge as successive volumes of water are brought into contact therewith, and discharging sufficient quantities of said accumulation to maintain a suitable equilibrium.

4. A process of removing silica from water comprising intimately mixing and agitating the water at a temperature above about 50° C. with magnesium oxide and lime, separating the water from the insoluble sludge formed therein, accumulating said sludge, adding additional quantities of magnesium oxide and lime to the accumulation of said sludge as successive volumes of water are brought into contact therewith, and discharging sufficient quantities of said accumulation to maintain a suitable equilibrium.

5. A process of removing silica from water comprising intimately mixing and agitating the water at a temperature above about 50° C. with a silica absorbing magnesium compound and an alkaline water softening agent, separating the water from the insoluble sludge formed therein, accumulating said sludge, adding additional quantities of said compound and an alkaline water softening agent to the accumulation of said sludge as successive volumes of water are brought into contact therewith, and discharging sufficient quantities of said accumulation to maintain a suitable equilibrium.

PAUL C. GOETZ.